H. STANLEY.
Heating Stove.
No. 1,078. Reissued Nov. 13, 1860.
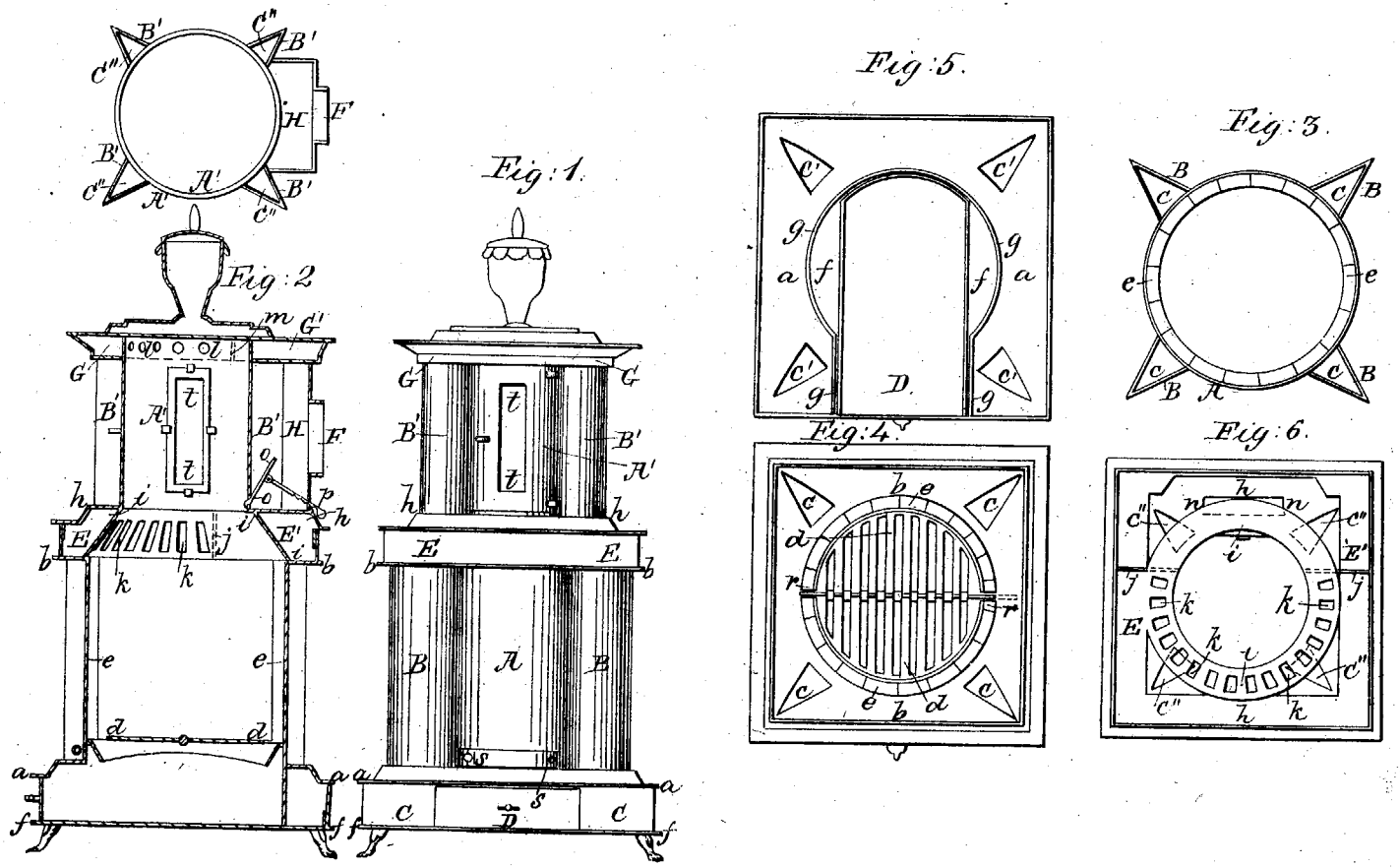
N. PETERS, Photo-Lithographer, Washington, D. C.

UNITED STATES PATENT OFFICE.

CHARLES EDDY AND JACOB SHAVOR, OF TROY, NEW YORK, ASSIGNEES, BY MESNE ASSIGNMENTS, OF HENRY STANLEY.

IMPROVEMENT IN COAL-STOVES.

Specification forming part of Letters Patent No. 3,876, dated January 4, 1845; extended seven years; Reissue No. 944, dated April 10, 1860; Reissue No. 958, dated May 8, 1860; Reissue No. 1,078, dated November 13, 1860.

*To all whom it may concern:*

Be it known that HENRY STANLEY, of West Poultney, county of Rutland, and State of Vermont, but now of the city of Troy, county of Rensselaer, State of New York, did, on the 4th day of January, A. D. 1845, obtain of and from the United States of America certain Letters Patent for and upon new and useful improvements in a stove or apparatus for heating apartments, and denominated therein "Stanley's Coal-Burner," and bearing the title of "Improvement in Coal-Stoves," which was duly extended, in conformity to law, on or before the 4th day of January, 1859, for a term of seven years from and after the said 4th day of January, 1859, and which renewed or extended Letters Patent were duly assigned to CHARLES EDDY and JACOB SHAVOR, each of the city of Troy, county of Rensselaer and State of New York, (and each of the firm of CHARLES EDDY & CO., of said city, &c.,) by JOHN STANLEY, sole assignee of HENRY STANLEY aforesaid, and which renewed or extended Letters Patent were duly reissued to the said CHARLES EDDY and JACOB SHAVOR on the 10th day of April, 1860, wherein and whereby the said CHARLES EDDY and JACOB SHAVOR became patentees under and by virtue of the aforesaid assignments, by which assignments they became and are the true and lawful owners and holders of the entire invention, improvements, and Letters Patent as renewed, revived, and extended for the aforesaid term of seven years; and which renewed, revived, and extended Letters Patent, reissued, as aforesaid, on the 10th day of April, 1860, were again, and for the second time, reissued on a second corrected and amended specification on the 8th day of May, 1860; we, therefore, the undersigned, patentees and assignees, do hereby declare that the following is a full and exact description of the said improvements and invention, reference being had to the accompanying drawings, and to letters of reference marked thereon, making a part of this specification, in which—

Figure 1 is a front elevation of the coal-burner, showing the construction, arrangement, and combination of the various parts of the front and other parts of the burner, hereinafter named. Fig. 2 is a vertical section through the center of the coal-burner, from front to the rear or back part thereof, and showing internal and external parts of the burner, hereinafter described. Fig. 3 is a horizontal section through the fire-chamber, showing the cylinder or chamber of combustion, flues, or columns combined therewith as hereinafter described. Fig. 4 is a horizontal section showing the fire-grate, fire-brick, fire-chamber, and the lower flues or columns connected therewith, and with the plinth or base projecting outward, as hereinafter described. Fig. 5 is a horizontal section through the said plinth or base, showing the ash pit and drawer or ash-pan D also, the air-chamber *a*, partition *g*, and the flue or column space *c'*, standing upon that part or portion of the said plinth or base projecting outward from the chamber of combustion, whereby the four flues, B, Fig. 3, are combined with the said air-chamber *a*, all of which are hereinafter described. Fig. 6 is a horizontal section showing the conical ring *i* and the grate *k* therein, at the top of the fire-chamber A, the intermediate chambers, E and E', hereinafter described, the communication therewith of the flue-openings *c''*, and the partition or division plates *j j*, hereinafter described. This view of this section is taken from below, looking upward into the upper section, having said upper flue-openings, *c''*, of the flues or columns B', Fig. 7. Fig. 7 shows the upper cylinder, A', flues or columns B', and the chamber H, also, exit-pipe F, hereinafter described.

The improvements consist in the arrangement and combination of the several internal and external parts hereinafter described and set forth—first, of the combination of the external parts as a whole, and, second, the sub-combinations of the external parts; also, of the internal parts, consisting, first, of a chamber of combustion and four triangular radiating-flues connected therewith, and resting upon and combined with the said projecting plinth or base, as hereinafter described; second, of a cornice or abacus resting upon and combined with the top of said chamber of combustion, and said flues connected with the fire-cylinder or chamber of combustion and hereinafter described; third, of the said plinth or base projecting outward from the said fire-cylinder or chamber of combustion so as to receive the said flues or columns, give space for ash-pit and air chamber *a*, and to increase the radiating-surface at or near the floor, while the chamber of combustion, the triangular radiating flues or columns are combined with said outward-projecting plinth or base, as hereinafter described; fourth, of the arrangement and combination of the shell *x* at or near the bottom of the said chamber of combustion, with the said chamber and fire-grate, as hereinafter described; fifth, of an annular intermediate chamber formed in the said cornice or abacus by means of the conical ring *i*, and the grate *k* therein, or the equivalent of either; sixth, of the arrangement and combination of the rear intermediate chamber, E′, formed in said cornice or abacus by means of the solid side of said conical ring *i*, or its equivalent; seventh, of an upper section, story, or surmounting chamber, A′, having therewith arranged and combined four triangular radiating flues or columns and the cornice G, as hereinafter described, which section or surmounting chamber and the said flues or columns thereto connected rest upon the top of and are combined with the said cornice or abacus of the said lower section or story, as will more fully appear hereinafter; eighth, of the arrangement and combination of the chamber H in the rear of the said upper section or surmounting chamber, A′, and its combination with the said rear intermediate chamber, E′, as hereinafter described and set forth; ninth, of the arrangement and combination of the said shell *x* with the draft port or opening *s*, or its equivalent, as hereinafter described, by means of which the heat is more perfectly radiated and the fuel better economized than has been heretofore effected—the construction, arrangement, combination, and subcombinations being different from all other "coal-stoves" or "burners," and cheap, durable, compact, and ornamental.

The exterior of the said coal-burner is composed of a square base or plinth elevated and resting upon four legs. This plinth or base projects outward from the said fire-cylinder or chamber of combustion A, so that space may be had and room given for the four triangular radiating flues or columns, B, at or near each corner of the said plinth or base, and at same time be connected with the said fire-cylinder and air-chamber *a a*, while an ash-pit is formed therein for the ash pan or drawer D, Fig. 5. The said air-chamber is formed by means of continuing downward to the bottom plate of the said plinth or base the outward and iron plate of the said cylinder of said chamber of combustion A, Fig. 1, and seen at *g*, Figs. 2 and 5; or this partition or division plate between the ash-pit and said air-chamber may be made separate from the said cylinder plate. The said air-chamber *a* extends around three sides of the said ash-pit *f f*, Fig. 5, and has communication with the said flues or columns B by means of the openings *c′*, Fig. 5. The combustion cylinder or chamber A and the four triangular radiating flues or columns B connected with said cylinder, as herein described, are each combined with this plinth or base and with the air-chamber *a* therein. On this plinth or base rests the chamber of combustion and the fire-cylinder A, Figs. 1 and 3, also the four triangular radiating flues or columns, B, connected and combined with said cylinder of said chamber of combustion, and standing one on each corner of the said plinth or base, opening there into the said air-chamber in the said plinth or base, as aforesaid. This chamber of combustion, its cylinder A, and the four radiating flues or columns aforesaid are surrounded and surmounted by a square corner or abacus, upon the top of which is placed a cylinder or chamber smaller than the one below, which forms the chamber of combustion, and which upper cylinder or chamber forms an upper section or story, capped with a cornice of proportionate dimensions with the one below upon the lower and first section or story. There are also four triangular radiating flues or columns arranged and connected with this cylinder or chamber in the same manner as are the flues or columns B with the cylinder or chamber of the first story or section below. The upper flues or columns, B′, Figs. 1, 2, and 7, are each smaller than those of the lower section or story and of proportionate dimensions. These flues or columns are arranged and combined with the said upper cylinder or chamber, A′, as seen at *c″*, Fig. 7. Upon this cylinder or chamber and flues or columns thus arranged is placed and combined therewith the cornice G, Figs. 1 and 2. Upon the top plate of this cornice there is an urn of proportionate dimensions. The four upper flues or columns, B′, Figs. 1, 2, and 7, are arranged upon and combined with the said square cornice or abacus E, one at each corner thereof, thus making the said cornice or abacus immediately between the said lower and upper sections or stories and between the said upper and lower triangular radiating flues or columns, arranged and combined as herein described. The said columns or flues are, each and every of them, triangular, as shown in the drawings at the different figures; or they may be of any other form and still carry out the same arrangement and combinations thereof, as herein stated. The exterior surface of each of the triangular flues or columns may be somewhat more convexed than as shown in the drawings, which will give more radiating-surface without interfering with the radiating-surface of the said fire-cylinder A, but, uniting therewith, forms a perfect radiation. The cornice or abacus E projects outward from the cylinder A, so as to receive the said four triangular flues or columns B, and thereby allow a combination of the same therewith, as hereinbefore and hereinafter stated. By this arrangement and combination of the said several parts, forming a stove or burner for coal, as shown in the drawings, a radiator of greatly-extended surface and of compact form is completed, in which the surfaces of radiation do not interfere or counteract each other.

The details of the interior of the said stove or coal-burner are as follows, to wit: The center portion of the said plinth or base has an ash-pit in it, into which the ash-pan D slides from the front of the said plinth or base and directly under the said chamber of combustion and the fire-grate *d*. This ash-pit is separated from the air-chamber *a*, Fig. 5, which surrounds three sides of it, as seen at same figure. The division or partition plate *g*, which separates the ash-pit from the said air-chamber *a*, is formed by the projection of the cylinder of the chamber of combustion A through the top plate and downward to the bottom of the said plinth or base, as shown at *g*, same figure, or the said division or partition plate *g* may be made separate from the said cylinder and connected with the top plate of the said plinth or base, upon which plate may then rest the said cylinder or chamber of combustion, and the said partition or division plate, if made separate and of itself, may be directly connected to and with the bottom of the said cylinder of the said chamber of combustion. The said fire-cylinder A, which forms the outward part of the chamber of combustion, is lined with fire-proof brick from the top of the shell *x*, Fig. 2, to the said cornice or abacus E, as seen at *e*, Figs. 2, 3, and 4. The flues B are connected to and with the fire-cylinder A and with each corner of the said plinth or base, and are of the same height of the said cylinder A and rest upon and are combined with that part of said plinth or base projecting outward from said fire cylinder, as aforesaid. Upon the top of the said cylinder, flues, or columns there is a plate or iron, *b*, Figs. 1, 2, and 4. This plate has openings at each corner, as seen at *c*, Fig. 4, which receive the flues or columns B, and which correspond to and with the said flue-openings in the top plate of the said plinth or base, on which rests the said first section or story, and seen at *c'*, Fig. 5. This plate forms the lower part of the said cornice or abacus E, upon which plate rises the frieze or outer plate of the said cornice or abacus E to receive the top thereof, *h*, Figs. 1, 2, and 6, which plate forms the upper part of the said cornice or abacus, and upon which rests the upper cylinder, flues, and chamber, H, which form the said upper section or story, Figs. 1 and 2. The said cornice or abacus E, projecting out and from the outside part of the said fire-cylinder A, allows the intermediate chambers to be formed, projecting outward from the top of the said fire-cylinder into the said cornice or abacus. The said flues or columns B' are each connected with the said top plate of the said cornice or abacus at each corner thereof, and are each of the same height of the said cylinder A', and are each connected and combined with the said cylinder A', as seen at Figs. 1, 2, and 7. Upon the top of the said cylinder and flues is placed and combined therewith the cornice G, surmounted by an urn. (Seen at same figure.) At the top of the said cylinder A, Figs. 2 and 1, there is a cone-shaped ring, *i*, more clearly seen at Fig. 6, the base of which is of the diameter of the lower and fire cylinder, A. It is contracted at the top, so as to correspond and conform to the size of the smaller and upper cylinder, A'. The width of the said cone-shaped ring is equal to the depth of the said cornice or abacus E on any desired angle, by means of which is formed an annular chamber at the top of the chamber of combustion, and in the said cornice or abacus E, when this air-chamber is thus formed, by means of the said cone-shaped ring *i*, or its equivalent, it is then denominated an "intermediate chamber," because being between the said upper and lower cylinders, and in the said cornice or abacus. The front part or portion of the cone-shaped ring *i* is pierced with any desired number of oblong appertures, whereby is formed the grating *k*, Figs. 2 and 6, which grating may extend over and upon more or less of its circumference, thus forming a communication between the said intermediate chamber in the cornice or abacus E and the upper part of the said chamber of combustion. The said cone-shaped ring *i* may be perforated with holes of any required size or form, and thus and thereby form a communication from the said combustion chamber into the said intermediate chamber. The said conical ring may be otherwise constructed to answer and accomplish the same purpose as herein described, all of which are its equivalents. The said intermediate annular chamber is divided into two parts by means of the partitions seen at *j j*, Figs. 2 and 6. By this division two intermediate chambers are formed. The first is a front one, and seen at E, Figs. 2 and 6. The second, and most important one, is in the rear or back part of the burner, and is seen at E', Figs. 2 and 6. The front chamber has communication with the chamber of combustion by means of the said grate-opening *k*, in the said cone-shaped ring, or its equivalent, while the back or rear part of said ring is solid, thus preventing any direct communication with said chamber of combustion. The solid part of said conical ring *i* is seen at Figs. 2 and 6, back of the said partitions *j*. These partition-plates *j j* may be placed upon any angle, and at any point, if desired.

The two back or rear flues (seen with their respective openings at *c'*, Fig. 5) open into the said rear intermediate chamber, E', thus forming an air passage from and with the air-chamber *a* in the said plinth or base, as seen at *c'*, Fig. 5. The front flues, B, of the lower section, as aforesaid, open into the front intermediate chamber, E, or front part or portion of said cornice or abacus, thus forming an air-passage from and over the top of the fire-cylinder or chamber of combustion, down and through the said front flues, into the said air-chamber *a* in the said plinth or base.

The conical ring *i* accomplishes these very important purposes at least—the first of which is the formation of the said intermediate chambers in the said cornice or abacus, as aforesaid, when used as an annular chamber; also the formation of the rear intermediate chamber, E′, in connection with the division or partition plates *j j*, as aforesaid, thus making the entire division of this chamber solid, so that when the damper *o*, Fig. 2, is closed, the draft will be changed from a direct to a circuitous, and from the combustion-chamber into the chamber in the front part of the said cornice or abacus, thence down and through the said front flues, and into the air-chamber *a* in the said plinth or base, up the back flues into the rear or back intermediate chamber, E′, so made by the said conical ring and the plates *j j*, or any equivalent, whereby the air is drawn from the room in which the coal-burner is used into, and through, the opening *s*, in front, or its equivalent, upon and against the shell *x*, thus highly heating it before it passes under and into the fire, to aid and facilitate combustion; thence through the fire and from and above the same in the said combustion-chamber through the opening or openings in the said conical ring *i* into the said front intermediate chamber, or into the front part of said cornice or abacus, in case the front part or portion of the cone-shaped ring and the grate *k* therein be omitted; thence in a highly-heated state down the front flues into the air-chamber *a* in the said plinth or base; thence into and up the rear flues into the rear intermediate chamber, E′; thence into the upper rear flues, B′, also into the chamber H, immediately in the rear of the upper cylinder, A′, and between the rear or back flues or columns, B′, connected and combined with said cylinder, and hereinafter described. The second office of this conical ring *i* is to protect the front flues, B, from any entrance of coal or ashes therein by means of the grate *k* in the front part thereof, and to give the same protection to the rear flues, B, by means of the solid part of the said conical ring, otherwise said flues would become somewhat clogged; and, third, the outer surface of the said cornice or abacus is shielded from direct action of the heat arising from and by reason of the coal or fire in the said chamber of combustion, whereby rapid and undue destruction of the iron and the injurious effect upon the external atmosphere caused by the too-highly heated iron is prevented. It may also be used for any other purpose desired.

In the front of the cylinder A, and at or near the bottom thereof, there is a draft-port or opening, *s*, which may extend up to the top part of the aforesaid fire-grate *d*, Fig. 4, as well as a little above or below the same, as the case may require, which grate is surrounded by the said shell or ring *x*, (seen at Fig. 2,) which shell descends downward to and below the said draft port or opening *s* to any required or desired distance. The air enters this draft port or opening *s*, impinges upon and against the said shell *x* and its downward projection, around which it circulates, becomes highly heated by virtue thereof, and while in a diffused and heated state or condition descends down upon and under the said shell *x* at all points thereof, and around the said fire-grate, and thence rises to supply heated air to the fire for the purpose of aiding, facilitating, and promoting the combustion, and to increase the volume or quantity of heat from a small amount of fuel. By this arrangement there is a space between the said shell *x* and the outer plate of the stove, in which the air is heated, as hereinbefore stated, preparatory to its entrance under the fire, all of which form a combination for the purpose above stated.

The cylinder A′, which is open to and into the lower cylinder, A, through the said cornice or abacus, has openings surrounding the front portion of its top, which communicate with the chamber in the cornice G. (Seen at *l*, Fig. 2.) This cornice-chamber is divided into two parts or chambers by means of partition-plates *m*, Fig. 2, and on each side of said cornice G. This forms a front chamber, G, and a back or rear chamber, G′, Fig. 2. The front flues, B′, connected with the said upper cylinder, A′, open into the said front chamber at their respective upper ends, while the lower ends thereof open into the front intermediate chamber, E, same figure. The purpose of this arrangement is two-fold: First, by means thereof the radiating-surfaces are materially and effectually extended; and, second, the deleterious gases rising from the fire below in the chamber of combustion into the said surmounting chamber or cylinder, A′, are conducted and drawn off through the said openings *l*, Fig., 2 into the front cornice-chamber, G, down the said front flues, B′, into the said front intermediate chamber in the said cornice or abacus, hereinbefore described, and thence and thereafter follow the main current or draft through the said front flues, B, thence into the air-chamber *a* in the said plinth or base, thence into and up the back or rear flues, B, into the said rear intermediate chamber, E′, thence into the said chamber H, thence into the exit-pipe F, Fig. 2, and thus are prevented from entering into the apartment. If an apparatus for consuming or burning the said gases be constructed in any part of the said conical ring *i*, forming the rear intermediate chamber, E′, Figs. 2 and 6, then the lower end of the said upper front flues, B′, may be closed up, in which case the inside of said flues must be left open into the said cylinder A′, so as to keep up the radiating-surface thereof. Of course, then the openings *l*, Fig. 2, might be omitted, there being no use for them; this, however, does not change or in anywise disturb the draft or current of circulation aforesaid described.

In the front of the cylinder or chamber A′ there is a door through which fuel is supplied to the fire in the chamber of combustion in the cylinder below, and in this door, as well as in the two sides of the said cylinder, there is an open-worked panel into which mica is inserted to show the fire or light therefrom.

In the rear of the top plate, *h*, Figs. 1 and 6, there is an opening, *n n*, as seen at said Fig. 6, which is made of any required or desired size. This opening forms a communication from the rear intermediate chamber, E′, into the lower part of the chamber H, Figs. 2 and 7. This is for the purpose of insuring a more perfect draft, as hereinbefore described. The said chamber H is formed in the rear of the said cylinder A′, and between the two rear flues or columns, B′, of the said surmounting chamber or upper section. This chamber H extends upward to the said rear chamber, G′, in the said cornice, or it may extend no higher than the top of the said exit-pipe F, for then the effect and operation would be the same. The draft would be changed and controlled in the same manner. The effect produced would be the same. The opening or collar F is for the attachment to said chamber H of a smoke or exit pipe, as used in ordinary stoves. An opening is made from the said cylinder A′ directly into the said chamber H, thereby forming a direct draft from the said chamber of combustion into the said surmounting chamber or cylinder A′, thence through said opening into said chamber H, thence into the said exit-pipe, which is used to facilitate the kindling of fires, to hasten the progress of combustion, or for any other purpose desired. To the said openings into said chamber H there is attached a damper, *o*, Fig. 2, which opens into the said chamber H, by means of which the current or draft is changed from a direct to a circuitous one, and vice versa and of course regulates the same. This damper is moved or operated by means of the stem P, which projects through the back of the said chamber H.

When the said damper *o* is closed into or against the said opening between the said chamber H and cylinder A′, then the draft is changed from the direct, and its course then is circuitous, commencing from the front and top part of the said chamber of combustion, forward into the said cornice or abacus, thence downward through the front flues, B B, into the said air-chamber *a* in the said plinth or base, back and along the sides of the said chamber, thence upward, and through the back flues, B B, into the said rear intermediate chamber, E′, thence into the said chamber H, through the said opening *n n*, Fig. 6. When this damper is thus closed, a large surface of radiation is put into successful operation by means of the arrangement and combinations of the said several parts, as hereinbefore described and set forth. When the said damper *o* is open, then the said circuitous draft is checked and the direct draft operates, as hereinbefore described. Then not as much heat is radiated. The gases in the said upper cylinder, A′, if any should there rise, will be drawn away and down by the said current below, as hereinbefore described. None, however, will rise therein if consumed or burned by the burner in the said conical ring *i*. By this form, arrangement, combination, and combinations of the said several parts, as herein described, a perfect and reliable coal-burner is completed, which is durable and economical, as well as cheap.

Having thus described the original invention, improvements, combination, and subcombinations thereof as originally made by the said HENRY STANLEY in the said coal stoves or burners, what we claim as his original invention and improvements in coal stoves or burners is—

1. The manner in which he arranged and combined as a whole the exterior parts, consisting of a projecting plinth or base, radiating columns, cornice or abacus E, cornice G, and of two cylinders—the first a fire-cylinder, A, having four triangular radiating flues or columns arranged, connected, and combined with the same, one at each corner of the said projecting plinth or base, each forming a communication with the air-chamber *a* in said plinth or base and with the said intermediate chambers, E and E′, in the said cornice or abacus, the second a surmounting cylinder, A′, having four triangular radiating flues or columns arranged, connected, and combined with the same, one at each corner of the said cornice or abacus E, having also the chamber H, and having the cornice G upon the top thereof, substantially as herein described and set forth.

2. The arrangement and combination of the said shell *x* at or near and with the lower end of the said fire-cylinder A and with the fire-grate *d*, substantially as herein described and set forth.

3. The arrangement and combination of the conical ring *i*, having therein the grate *k*, with the intermediate chamber, E, substantially as herein described and set forth.

4. The arrangement and combination of the conical ring *i* and the solid part thereof with the rear intermediate chamber, E′, substantially as herein described and set forth.

5. The arrangement and combination of the upper cylinder, A′, and the flues or columns B′, and the chamber H, connected therewith, with the cornice or abacus E, or its equivalent, as and for the purposes herein described and set forth.

6. The arrangement and combination of the chamber H, having therein the damper *o* and thereto attached the exit-pipe F, with the rear intermediate chamber, E′, substantially as and for the purpose herein described and set forth.

7. The arrangement and combination of the said shell *x* with the opening *s*, or its equivalent, to diffuse and heat the air preparatory to its entrance under and into the fire, to aid, facilitate, and promote the combustion of the fuel, and to increase the volume or quantity of heat by means thereof, as herein described and set forth.

8. The arrangement and combination of the cornice G with the flues or columns B′ and with the cylinder A′, substantially as herein described and set forth.

In testimony whereof we have on this 5th day of November, 1860, hereunto set our hands.

CHARLES EDDY.
JACOB SHAVOR.

In presence of—
MARCUS P. NORTON,
A. C. CORSE.